INVENTOR
WILLIAM B. GREENBERG
BY Robert K. Youtie
ATTORNEY.

INVENTOR.
WILLIAM B. GREENBERG
BY
ATTORNEY.

INVENTOR.
WILLIAM B. GREENBERG
BY
Robert K. Youtie
ATTORNEY.

3,606,986
COPPER-REFINING APPARATUS AND THE LIKE
William B. Greenberg, 1510 Brinton Park Drive,
Wynnewood, Pa. 19096
Original application Feb. 5, 1968, Ser. No. 702,973, now Patent No. 3,561,952, dated Feb. 9, 1971. Divided and this application Aug. 7, 1970, Ser. No. 61,986
Int. Cl. C22b 15/06
U.S. Cl. 266—36H
7 Claims

ABSTRACT OF THE DISCLOSURE

This invention is especially concerned with apparatus for the production of refined copper from scrap and/or other impure copper having high lead and/or tin content wherein slag formers may be selected from compounds of borates, silicates, phosphates and alkali oxides.

CROSS-REFERENCES TO RELATED APPLICATIONS

This application is a division of my copending application Ser. No. 702,973 filed Feb. 5, 1968 and now Pat. No. 3,561,952.

BACKGROUND OF THE INVENTION

As is well known to those versed in the art, the refining of copper scrap, and especially of No. 2 copper scrap, to relatively low levels of tin and lead, particularly the latter, has been uneconomical in this country. The time and expense involved in the refinement of copper scrap, say No. 2 copper scrap to a lead content up to and including .004% has heretofore been too time consuming and expensive in the United States to meet lower-cost operations in foreign countries.

SUMMARY OF THE INVENTION

Accordingly, it is an important object of the present invention to provide apparatus for refining copper scrap, which effects substantial economies in labor, time, and cost and maintenance of equipment, so that the refinement of even No. 2 copper scrap to lead content up to and including .004% is economically feasible in the United States.

It is still a further object of the present invention to provide unique improvements in the refinement of copper scrap including particular combinations of furnace linings and slag-forming materials to achieve a high degree of refinement at considerable savings in time and cost.

It is still a further object of the present invention to provide apparatus for use in copper-scrap refining wherein the apparatus is relatively simple in structure while capable of performing multiple operations in the scrap-refining method of the instant invention.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the following description, and of which the scope will be indicated by the appended claims.

DESCRIPTION OF THE PREFERRED EMBODIMENTS

Figure 1:
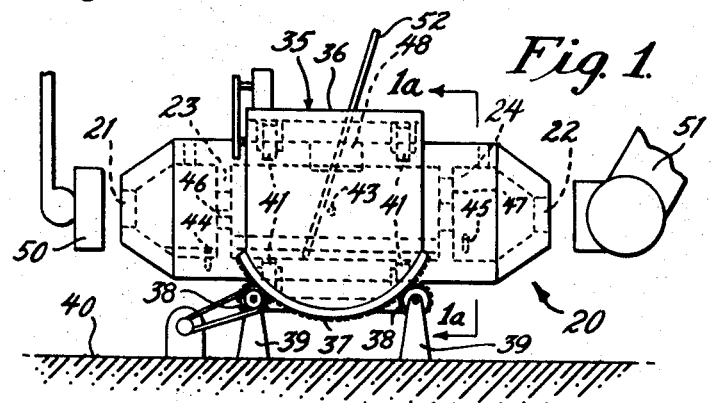
FIG. 1 is a diagrammatic longitudinal elevational view showing apparatus of the present invention in an early stage of the instant method.

The disclosure of the instant invention relates to the refinement of various types of copper scrap to relatively low levels of tin and lead while, in some cases, achieving commercially valuable by-products such as bronze, and effecting reuse of slag to considerably reduce costs.

In general, copper scrap at the refining stage may be subdivided into No. 2 copper scrap or blister copper which includes substantial amounts of both lead and tin, each usually being present by over ½% and in substantially equal amounts. Another type of copper scrap at the refining stage is designated black copper and is relatively high in lead content, generally about 3½% to 7% lead, and also relatively high in tin content, say on the order of 3½% to 7% tin. These different types of copper scrap may all be refined by slight variations in the instant invention.

In a furnace capable of generating heat sufficient to melt copper, there is provided a furnace lining of high acidity. The lining material has been found to comprise at least 70% by weight of $SiO_2$. In the same furnace there may be provided a separate section of reducing lining, say of carbon, carbon-bonded silicon carbide, clay and graphite, or other suitable reducing material. If desired, a separate reducing furnace may be employed.

In the embodiment shown in FIGS. 1–9, there is a furnace generally designated 20 which may be of an elongate, generally cylindrical configuration having its opposite ends open, as at 21 and 22. The furnace 20 may be subdivided interiorly by a pair of spaced, transverse partitions or walls 23 and 24, which serve to divide the interior of the furnace into a plurality, namely three interior compartments, sections or chambers. An intermediate chamber or section 25 is located between the barriers 23 and 24, while an end chamber or section 26 is located between the barrier 23 and its adjacent end opening 21, while an additional end chamber or section 27 is located between the barrier 24 and its adjacent end opening 22. The intermediate chamber or section 25 is lined with an acid material, as at 30, which may be at least 70% by weight of $SiO_2$. The end chambers or sections 26 and 27 are each provided with a reducing lining, as at 31 and 32, which may be formed of carbon, carbon-bonded silicon carbide, clay and graphite, or other suitable reducing material or refractory.

Figure 1A:
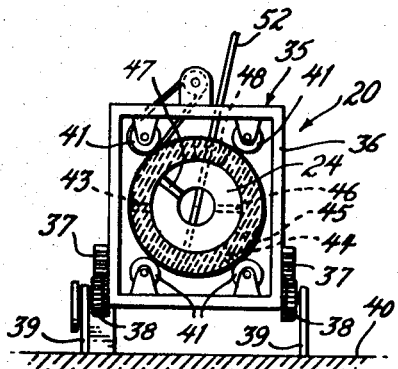
FIG. 1a is a transverse sectional view taken generally along the line 1a—1a of FIG. 1.

A furnace-mounting means is generally designated 35, see FIGS. 1 and 1a and is adapted to mount the furnace 20 for both tilting movement about a transverse axis and rotative movement about a longitudinal axis. For example, the mounting means 35 may include a frame 36 about the medial region of the furnace 20 and provided on opposite sides with arcuate spur-gear sectors 37, each of which rests on a pair of rotary pinions 38, the pinions being mounted on pedestals 39 upstanding from a supporting surface or floor 40. By powering one or more of the pinions 38, the sectors 37 are caused to rotate and effect longitudinal tilting of the furnace 20.

In addition, the frame 35 may be provided a plurality of longitudinally extending rollers 41 rotatably supporting the cylindrical furnace 20 for axial rotation of the latter. Thus, the furnace is mounted for both axial and transverse rotative movement. Of course, suitable power and control means may be associated with the mounting means 35 to effect the desired furnace movement.

Extending outwardly through the acid lining 30 of medial chamber 25 and opening exteriorly of the furnace 20 is a copper taphole 43 of any desired construction. Similarly a bronze taphole 44 extends outward through the reducing lining 31 of end chamber 26, as as 44. An additional outlet opening or bronze taphole 45 extends outward through the reducing lining 32 of end chamber 27 exteriorly of the furnace 20. As best seen in FIG. 1a, the tapholes 43, 44 and 45 are located in specific angular location about the generally cylindrical furnace 20, for a purpose appearing presently, and are provided with suitable closure means.

Also apparent in FIG. 1a is the generally annular configuration of each barrier or partition wall 23 and 24, generally concentric with the cylindrical furnace 20. The barrier wall 23 is provided with a radial slot 46 extending outward from its central opening toward and terminating adjacent to the interior surface of the furnace, the slot or passageway 46 thereby affording communication between chambers 25 and 26. A similar radially extending slot 47 is formed in partition wall 24 extending radially outward from the central opening therein toward and terminating adjacent to the inner lining of the furnace 20 to provide communication between the chambers 25 and 27. As best seen in FIG. 1a, the slots or passageways 46 and 47 are spaced angularly apart from each other, and also spaced angularly apart from the tapholes 43, 44 and 45.

Spaced from the medial-chamber taphole 43, the furnace wall of the medial chamber may be provided with a relatively large side charge door 48 facilitating the introduction of materials into the furnace.

While the furnace constructed described hereinbefore may be preferred, it is appreciated that other furnace constructions may also be employed in practicing the method of the instant invention, including conventional furnace constructions and others which will be described more fully hereinafter.

In practice of the instant method, first let us consider the refinement of relatively impure copper scrap, say up to 7% lead and 7% tin. The scrap, either in solid or molten form, is charged to the acid-lined medial chamber 25 of the furnace 20 through the charge door 48. The furnace is generally horizontal in this condition, as in FIG. 1, and is being heated, as by a burner 50 issuing fuel into the furnace through end opening 21, where the fuel is burned and the exhaust removed through opposite furnace end opening 22 and an adjacent flue 51.

A slag is initially charged to the medial chamber 25, and in the instant embodiment may be an alkali-oxide-silicate slag such as $Na_2O-SiO_2$ or $Na_2O \cdot 3.22 SiO_2$. The alkali-oxide-silicate slag may be completely in solid form as a compound, or glass, or may advantageously be introduced at least partially as a compound or glass into the furnace to form a starting pool, where e.g. sand and soda ash are added. Other alkali-oxide-silicates may also be used, such as potassium, calcium, or lithium, and in addition, alkali-oxide phosphates and/or borates can be used.

With furnace heat sufficient to melt the copper scrap and slag, the molten copper remains on the bottom in contact with the acid lining 30, and the slag floats on top.

Figure 2:
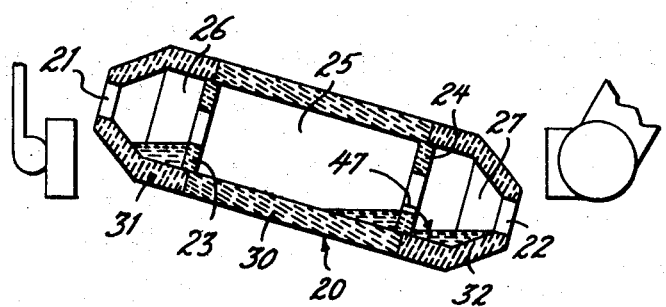
FIG. 2 is a diagrammatic longitudinal sectional elevational view illustrating a slightly later stage in the instant method.

The copper is then oxidized by suitable means, such as blowing air or oxygen, as through a tubular lance or tuyere 52 into the molten copper. During the oxidizing procedure it is advantageous to maintain an oxidizing atmosphere in the furnace, as by an excess of oxygen being introduced with the fuel at the burner. This condition is illustrated in FIG. 1, and in this condition the tin is effectively oxidized and removed from the copper to the slag, only a relatively small amount of tin remaining in the copper. Some lead is also oxidized and removed from the copper to the slag, and some copper is oxidized into the slag and some remains in solution in the molten copper. After optimum oxidation of tin, the alkali-oxide-silicate slag is removed from the copper. This may be accomplished by any suitable means, but in the instant invention is quickly and easily achieved by mere tilting of the furnace 20, and rotating slot 47 as shown in FIG. 2, to pour the alkali-oxide-silicate slag from the medial chamber 25 through the barrier 24 and slot 47 to the end chamber 27, where it contacts the reducing lining 32.

Figure 3:
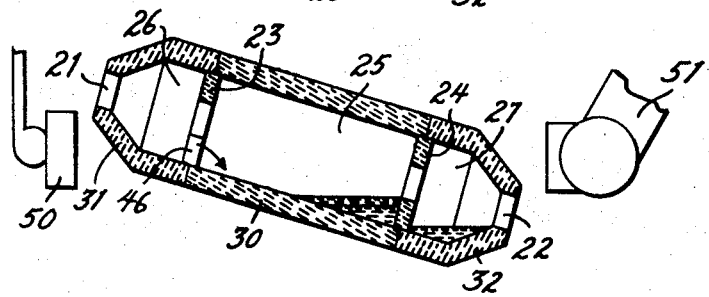
FIGS. 3–9 are longitudinal sectional elevational views showing successive stages in operation of the instant method.

During the preceding operation a boron slag, such as boron oxide, has been introduced into the chamber 26. In place of boron oxide the following may be used: alkali-oxide phosphate plain, or alkali-oxide boron phosphate, plain or alkali-oxide silicon phosphate and plain silicon borates. With the furnace 20 tilted as shown in FIG. 2, rotation of the furnace to locate the slot 46 lowermost for passing the boric-acid slag in to the medial chamber 25. This procedure is shown in FIG. 3.

Figure 4:
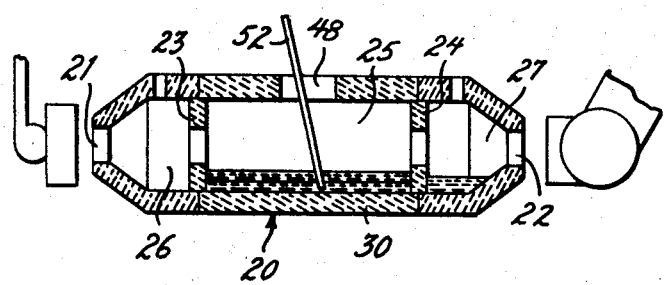

In FIG. 4 is shown an additional oxidizing step, oxygen being introduced through the lance 52 into the copper in medial chamber 25 beneath the boron-oxide slag. By this procedure the lead from the copper is effectively oxidized and removed to the slag, taking place under oxidizing conditions, as noted hereinbefore. Also, the remaining tin and some copper is oxidized into the slag. Of course, the furnace 20, as seen in FIG. 4, has been returned to a generally horizontal position and rotated to locate the slag-passage slots 46 and 47 upward to prevent communication between the medial and end chambers.

Figure 5:
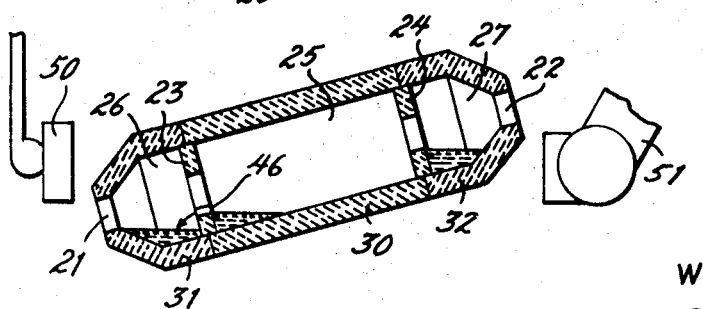

After oxidation and removal of the lead, the boron-oxide slag may be returned to the reducing lining 31 of end chamber 26, as by tilting of the furnace 21 and rotating the slot 46 to the position shown in FIG. 5.

Figure 6:
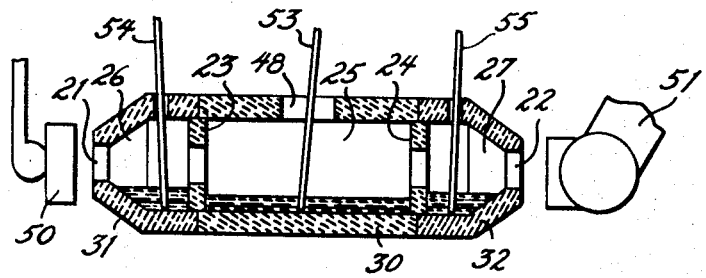
Figure 7:
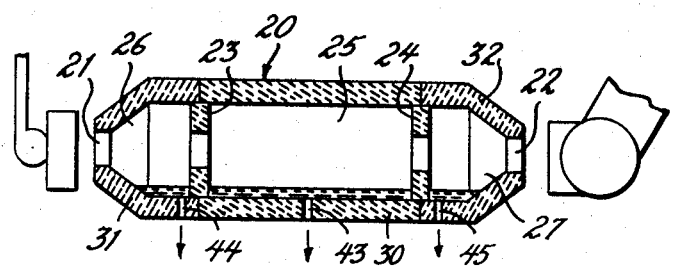

Upon return of the furnace 20 to its horizontal position of FIG. 6, the molten copper may contain substantial $Cu_2O$, and may be reduced to tough pitch copper or better by the blowing of butane or other suitable reducing gas through a reducing lance 53 into the copper. The boron-oxide slag and alkali-silicate slag may also be reduced in their respective chambers 26 and 27, as by blowing butane and carbon through reducing lances 54 and 55. Any low-sulphur and low-ash carbonaceous material may be employed, e.g. calcined petroleum coke. This causes the settling out of lead-rich bronze from the boron-oxide slag and settling out of tin-rich bronze from the alkali-oxide-silicate slag. The copper, lead-rich bronze and tin-rich bronze may then be tapped from respective tapholes 43, 44 and 45 upon angular shifting or rotation of the furnace 20, as required. For simplicity of illustration in FIG. 7, the bronze and copper tapholes 44, 45 and 43 are shown in line, but are preferably angularly spaced for separate tapping operations. Excess lead, beyond solubility limits, will settle out in the mold, and can be mechanically separated.

Figure 8:
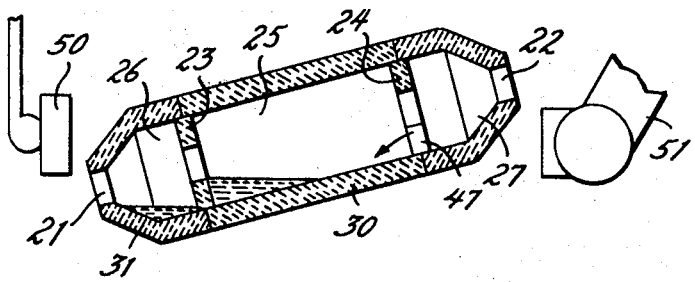
Figure 9:
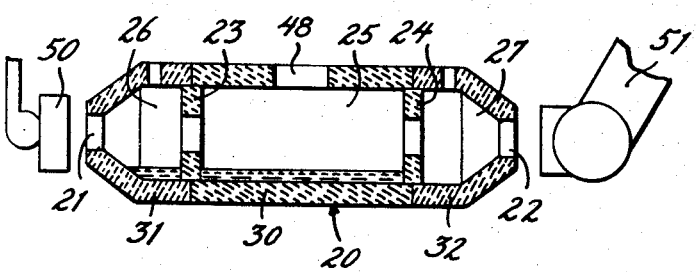

The slags remain in their respective chambers, having been rejuvenated by the reducing actions and removal of bronze. Upon rotation of the furnace 20 and tilting to pass the alkali-oxide-silicate slag from its chamber 27 to chamber 25, as best seen in FIG. 8, the furnace may be rotated and tilted to assume the position of FIG. 9, which is similar to that of FIG. 1, preparatory to receiving impure copper to be refined. Of course, the copper previously processed may be subjected to repeated refining, either by one or both of the slags, should further lead or tin removal be required. Also, it is appreciated that copper scrap having relatively low lead content and relatively high tin content may only require refining by the alkali-oxide-silicate slag alone; and similarly, copper scrap having relatively high lead and low tin may be refined by use only of the boron-oxide slag. Then only a two-compartment furnace would be needed. Also, if the slag was not reduced and returned to the same copper bath, a rotating only-two-compartment furnace could be used without tilting. Such a furnace could be end charged or side charged, the former without a side door.

Upon removal of more heavily "poled" copper from the furnace, it has been found advantageous to pass the molten copper through a bed of carbonaceous material, such as calcined petroleum coke under a reducing atmosphere, say an atmosphere of carbon monoxide, while pouring into ingot molds under reducing conditions, to produce an exceptionally oxygen- and hydrogen-free copper, rather than the usual tough pitch copper.

Figure 10:
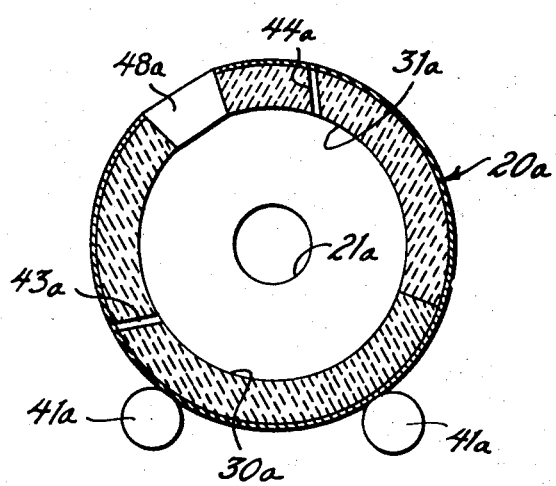
FIG. 10 is a transverse sectional view showing another embodiment of furnace constructed in accordance with the teachings of the present invention.

Referring now to the embodiment of FIG. 10, there is shown therein a transverse cross-sectional view of a generally cylindrical furnace $20a$ which may comprise a single chamber having open ends, as at $21a$, as for the introduction of burner fuel and egress of combustion products. The interior of the furnace $20a$ is provided with an arcuate segment of acid lining, as at $30a$ extending the length of the furnace and through an arc of approximately 200°. The acid lining or section $30a$ may be composed of at least 70% by weight $SiO_2$.

Extending arcuately from one longitudinal edge of the acid lining $30a$ is a section $31a$ of reducing lining, such as carbon-bonded silicon-carbide brick, substantially pure carbon, graphite which may include clay, or other suitable reducing material. The reducing-lining section $31a$ may extend through the remainder of the furnace and an arc of approximately 130° at the door cross section with one longitudinal edge proximate to a longitudinal edge of the acid-lined section $30a$. Thus, the lining sections $30a$ and $31a$ may each be considered as concave and arranged in side-by-side relation.

The furnace $20a$ may be mounted by any suitable means, such as rollers $41a$ extending longitudinally of the furnace, whereby the furnace may be axially rotated, for purposes appearing presently.

Extending outwardly through the acid-lined section $30a$ and opening exteriorly of the furnace may be a copper taphole $43a$. The copper taphole $43a$ is located in spaced relation between longitudinal bounds of the acid-lined section $30a$. An additional taphole $44a$, with suitable closure means, extends outward through the reducing lining $31a$ and opens exteriorly of the furnace, being located in spaced relation between opposite longitudinal bounds of the reducing lining. In addition, the furnace $20a$ is advantageously provided with a charge door $48a$, which may be located between the acid-lined section $30a$ and reducing lining $31a$. As shown in solid lines, the charge door $48a$ is in an upper region of the furnace $20a$, as is the bronze taphole $44a$. However, the copper taphole $43a$ is in a lower-side region of the furnace. In the solid-line position illustrated in FIG. 10, with the furnace being heated, impure copper may be charged through the door $48a$, or through the burner end-door opening either as a solid scrap or in molten condition. The solid or molten scrap is thus gravitationally placed on the acid lining $30a$. For example, let us consider No. 2 copper scrap having a lead content of between ½ and 1%, and a tin content of between ½ and 1%.

Under continued furnace-heating conditions slag formers are introduced into the furnace, which may include plain or alkali-oxide borosilicates, alkali-oxide borophosphate, alkali-oxide phosphate, or plain or alkali-oxide boro-silico-phosphate. The slag-forming material may be introduced into the furnace either in solid form, the e.g. alkali-oxide borosilicate being a glass, or the alkali-oxide borosilicate glass may be used to form a starting pool in the furnace and the ingredients added to the partially liquefied glass. For example, a slag-forming material composed of borax and silica sand may be employed. A particular composition of borosilicate and alkali oxide may assume the following composition:

| | Percent by wt. |
|---|---|
| $SiO_2$ | 80.6 |
| $B_2O_3$ | 11.3 |
| $Al_2O_3$ | 2 |
| $Na_2O$ | 3.8 |
| $K_2O$ | .6 |
| $CaO$ | .4 |

Under oxidizing atmosphere, as by injecting excess air at the burner, the scrap is oxidized by blowing air or oxygen with lance or tuyere into the molten copper. The resultant lead oxide and tin oxide and copper oxide are separated into the slag and some copper oxide remains in solution in the molten copper. Occluded copper prills can be released from the slag by heating to increase fluidity of the slag and stirring.

The furnace $20a$ may then be rotated about its axis to place the taphole $43a$ lowermost, and the copper removed through the taphole, as by passage through a closed launderer. In the launderer the copper is reduced by injecting butane or other suitable reducing gas into the molten copper to lower the copper-oxide level as required, say below .45% as in tough pitch copper. Further reduction may be achieved as described hereinbefore and followed by passage of the molten copper through a carbonaceous bed under a reducing atmosphere.

After the pouring and reduction of the molten copper, the furnace $20a$ may be axially rotated so that the slag remaining in the furnace is placed on the reducing lining $31a$. The furnace is maintained with a reduced atmosphere, as by a rich fuel-air mixture, and the slag blown, as by lance or tuyere with a reducing gas, say butane or a mixture of butane with carbon. Sufficient furnace temperature is required to maintain the slag sufficiently liquid for migration thereof for effective oxygen removal.

The slag-reducing operation effects separation of bronze from the slag, which bronze may be tapped through the hole $44a$. More specifically, slag reduction by butane effects removal of tin-rich bronze from the slag, while slag reduction with butane and carbon effects lead-rich-bronze removal. Thus, if it is desired to separately tap the tin-rich bronze and lead-rich bronze from the slag, the tin bronze may be first removed by reduction with butane alone, and the lead-rich bronze later removed by reduction flushing with a reducing atmosphere, such as with butane and carbon.

While the bronze thus recovered is of commercial value, the slag reduction serves to rejuvenate the slag for repetition of the above-described refining procedure.

That is, the furnace $20a$ may be rotated to assume the initial solid-line position shown in FIG. 10 with the slag on the acid lining $30a$, and a new charge of copper scrap introduced into the furnace. If desired, copper scrap of initially high lead and tin content may be refined to further reduce the lead-tin content, if either the copper or slag is removed from the furnace during said slag reduction and the original slag may be reused after rejuvenation.

While the tin-removing slags and the lead-removing slags were described hereinbefore as being used conjointly for highly effective tin and lead removal, respectively, it is appreciated that these slags may be employed separately or independently of each other if desired in a furnace like $20a$ or two furnaces like $20a$ of FIG. 10 operating in tandem. The copper can be duplexed. The scrap is melted in one furnace and tin oxidized out, and the unfinished copper poured into another furnace. It is there further oxidized for lead removal and then poured through a "poling" launderer to finished copper mold. The advantage of this is that the longest operations, melting and final casting can be done simultaneously in both furnaces.

Also, it is appreciated that the methods of the present invention may be employed in conjunction with other apparatus, such as two-compartment furnaces, or single-compartment furnaces without a reducing lining, the latter requiring removal of the slag for reduction. Under conditions where the alkali-oxide-silicate, phosphate, and/or borate slags are used independently, it is not as essential that the lining be acid for tin-favoring removal. For example, a basic lining portion would be more favorable for tin removal and more resistant to the more basic tin-removal slags.

While rejuvenation of the slag, as described hereinbefore, enables the repeated reuse, the alkali-fluxed borosilicate slag tends to gain $SiO_2$ and $Al_2O_3$ from the acid lining, so that the addition of borax from time to time may be desirable. The same is true for the alkali-oxide-fluxed boron phosphate, borate, phosphate, silicon phosphate and silicon-boron-phosphates which will become complex alkali-fluxed silico-boron phosphate.

Upon continued reuse of the boron-oxide slag, $B_2O_3$ may vaporize as $H_3BO_3$ (boric acid) and be lost, and the slag may gain $SiO_2$ from the acid lining, so that the gradual addition of alkali oxides, such as soda ash, which is $Na_2CO_3$ and decomposes into $Na_2O$, converts the boron-oxide slag to alkali-oxide borosilicate slag. $B_2O_3$ may be added in early stages to replenish the vaporized $H_3BO_3$, as well as for plain silicon-phosphate, silicon-borate, boron-phosphate and boron-silicon-phosphate slags for $SiO_2$ pick-up. Boron phosphate can also be used instead of $B_2O_3$.

The alkali-oxide-silicate slags may tend to gain $SiO_2$ from the acid lining, so that their proper proportions may be maintained by periodic addition of alkali oxide. The alkali-oxide-phosphate and/or -borate and/or -silicate slags would gradually become complex silicates, which can also be continued to be used by adding alkali oxide and/or alkali-oxide phosphate instead of the borax indicated above.

Figure 11:
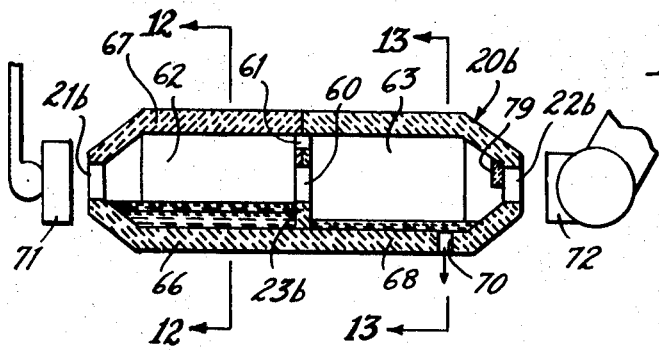
FIG. 11 is a longitudinal sectional elevational view showing another embodiment of furnace constructed in accordance with the teachings of the present invention.

FIGS. 11–16 are illustrative of a two-compartment furnace operation in accordance with the instant invention. As best seen in FIG. 11, a furnace is there generally designated 20b, which may be of an elongate generally cylindrical configuration having its opposite ends open, as at 21b and 22b. The furnace 20b may be divided interiorly by a transverse wall or partition 23b having a central through hole 60, and provided at one location adjacent to the interior furnace surface with an additional port 61.

Thus, the interior of furnace 20b is subdivided by partition 23b into a pair of adjacent chambers 62 and 63, respectively opening outwardly through furnace ends 21b and 22b. A charge door may be provided through the furnace wall of compartment 62, if desired, or the charge may be introduced through end opening 21b.

Figure 12:
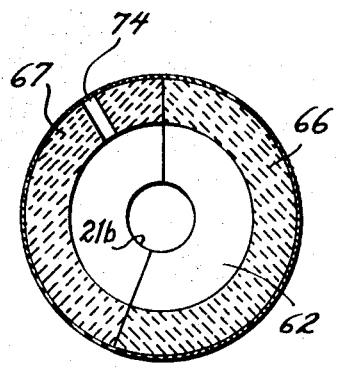
FIGS. 12 and 13 are transverse sectional elevational views taken generally along the lines 12 and 13, respectively, of FIG. 11.
Figure 13:
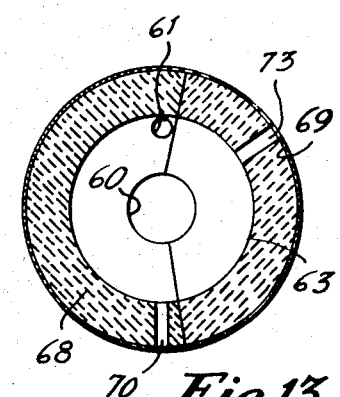
Figure 15:
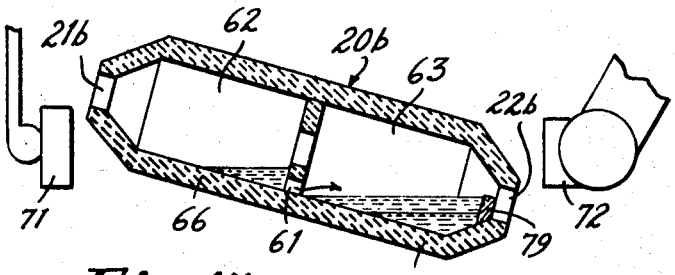
FIG. 15 is a longitudinal sectional elevational view of the furnace of FIG. 11, illustrating a stage in the method of the present invention.
Figure 16:
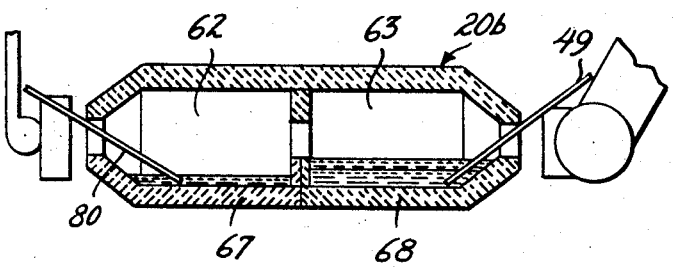
FIG. 16 is a longitudinal sectional elevational view similar to FIG. 15, illustrating a later stage in practice of the instant method.

The compartments 62 and 63 are each generally cylindrical, and the interior of compartment 62 is provided with an acid lining 66 interiorly of the compartment extending through an arc of approximately 200°, see FIG. 12. In addition to the acid-lining section 66, the remainder of the interior of chamber or compartment 62 is lined with a reducing material, such as carbon, as at 67. Similarly, the interior of furnace chamber or compartment 63 is provided with a cylindrical segment of acid lining 68, see FIG. 13, of approximately 200°, and the remainder of the chamber 63 is provided with a reducing lining 69, say of carbon. These linings, and their arcuate extents are best seen in FIGS. 12 and 13. It will also there be appreciated that the acid linings 66 and 68 of respective compartments 62 and 63 are out of alignment with each other longitudinally of the furnace, as are the carbon or reducing linings 67 and 69 of the respective chambers. Further, the reducing linings 67, 69 are substantially completely angularly offset from each other, while the acid linings 66 and 68 are partially angularly overlapping. At a location remote from the port 61, opening through the acid linings 68 of compartment 63, there may be formed a copper taphole 70. Also, a lead-bronze taphole 73 is provided in chamber 63, and a tin-bronze taphole is provided in chamber 62. The tapholes may be provided with necessary closures. Associated with the furnace 20b, adjacent to opposite ends 21b and 22b may be provided a burner 71 and a flue 72, the burner and flue being movable into and out of communicating relation with their respective adjacent end openings, if desired.

Figure 14:
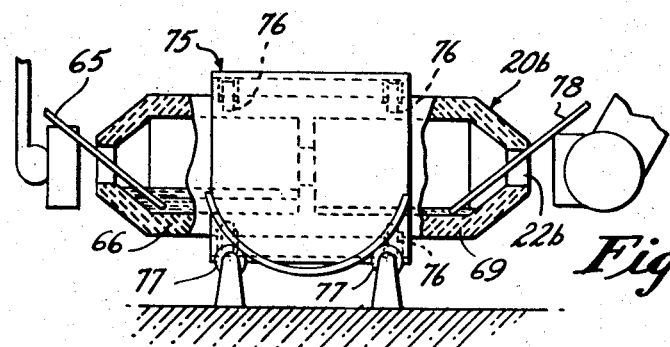
FIG. 14 is a diagrammatic side elevational view of the furnace of FIG. 11.

The furnace 20b is suitably mounted, as by mounting means 75, see FIG. 14, including rollers 76 affording axial rotation to the furnace, and rollers 77 affording transverse rotation or tilting movement to the furnace.

In accordance with the method of the instant invention, a tin-removal slag, such as sodium-silicate glass or sodium metasilicate may be employed in one chamber of furnace 20b, say chamber 62, and a lead-removal slag may be employed in the other chamber 63, such as boron oxide. The condition shown in FIG. 11 is that where fully treated copper is being bottom-poured through taphole 70 from beneath the lead-removal slag. During this copper removal, copper-bearing scrap is charged into compartment 62 with the previously reduced tin-removal slag and heat applied to the furnace as from burner 71 to effect melting of the scrap. The angular position of the furnace 20b in FIG. 14 is such that the acid lining 66 of compartment 62 is lowermost for supporting the copper scrap and slag, while the reducing lining 69 of the compartment 63 is lowermost and supporting the lead-removal slag. During treatment of the scrap in chamber 62 with blowing air lance 65 and tin-removal slag to remove tin, the lead-removal slag in chamber 63 is reduced, as by the introduction of butane and carbon as through a lance 78. The furnace is then rotated to place lead-bronze taphole 73 lowermost and bronze tapped from chamber 63.

Following this the furnace 20b is rotated to place the acid lining 66 of compartment 62 downward, and the partially treated copper from compartment 62 is poured through port 61 to chamber 63, while the tin-removal slag remains in chamber 62. This is accomplished by tilting of the furnace 20b, as by rotation about a transverse axis shown in FIG. 15. If desired, a dam segment or stop 79 may be placed across the furnace end opening 22b to prevent removal of material from the chamber 63.

Under continued heating, the copper end chamber 63 is treated by the blowing air lance 49 and lead-removal slag, and simultaneously the tin-removal slag remaining in chamber 62 may be reduced, as by the introduction thereto of butane and carbon, as through a lance 80. If desired, butane may be used alone for predominant tin removal. This permits lead build-up in slag to prevent future lead removal. In this condition, the furnace 20b has been slightly rotated so that the reducing lining 67 of compartment 62 is lowermost and supporting the tin-removal slag, the acid lining 68 of compartment 63 remaining lowermost and supporting the copper being treated. In this stage additional oxygen is being introduced into the copper for oxidizing impurities which are removed into the slag. The furnace is then rotated to place the tin bronze taphole 74 lowermost and the bronze is tapped from chamber 62. From this condition, the furnace 20b is rotated to the condition of FIG. 11 for removal of refined copper by bottom-pouring through taphole 70 and thence through a reducing launder for "poling" of copper.

By way of further example of the instant method, tin-removal slags (those favoring removal of tin over lead) may include 3.22 $SiO_2/Na_2O$ alkali-oxide-silicate glass or $SiO_2/Na_2O$ alkali metasilicate which are good for use on starting scrap of up to 1% tin and ¼% lead for the former, and starting scrap of up to 1% tin for the latter.

Other satisfactory slags favoring the removal of tin over lead are alkali pyrophosphate, e.g. $2Na_2O/P_2O_5$; alkali-oxide boryl phosphate, e.g. $2Na_2O/B_2O_3/P_2O_5$; and alkali orthosilicate, e.g. $2Na_2O/SiO_2$; and alkali metaborate, e.g. $Na_2O/B_2O_3$.

Additional slag-forming materials which favor removal of lead over tin, in place of boron oxide, which was good for use on starting scrap of up to 1% lead, include plain silicoborates, e.g. $B_2O_3/SiO_2$ to $SiO_2/3B_2O_3$; alkali metaphosphate, e.g. $Na_2O/P_2O_5$ or $NaPO_3$; alkali-phosphate tetraborate, e.g. $Na_2O/P_2O_5/2B_2O_3$; 15% by weight of alkali metaphosphate in boron oxide, e.g. 15% by weight of $NaPO_3$, 85% by weight of $B_2O_3$; alkali-oxide fluxed silicate phosphate; plain silicyl metaphosphate, e.g.

$$SiO_2/P_2O_5$$

plain boron phosphate (some people call this boron orthophosphate), e.g. $BPO_4$ or $B_2O_3/P_2O_5$.

In addition to alkali-oxide borosilicate for use as "balanced" lead-and-tin-removal slags, which was good for use on starting scrap of up to ½% lead and over ½% tin, there are plain borosilicate, e.g. $B_2O_3/3SiO_2$ and $B_2O_3/2SiO_2$, etc.; alkali tri polyphosphate, e.g.

$$5Na_2O/3P_2O_5$$

alkali - oxide - boratephosphate, e.g. $Na_2O/B_2O_3/P_2O_5$; plain or alkali-oxide silicatephosphate borate, e.g. 55% $BPO_4$/45% $SiO_2$.

The silicate-phosphate-borate is good for use on starting scrap of up to 1% lead and 1% tin.

Of course, repeated treatment of the same copper material, as described hereinbefore, permits use of even higher lead-and-tin-content scrap.

From the foregoing, it is seen that the present invention provides an apparatus for the refinement of impure copper which fully accomplishes its intended objects and is well adapted to meet practical conditions of use.

Although the present invention has been described in some detail by way of illustration and example for purposes of clarity of understanding, it is understood that certain changes and modifications may be made within the spirit of the invention.

What is claimed is:

1. In a furnace for refining copper, the combination comprising: a container; a first section of refractory lining in said container for containing slag and copper material to be refined; a first outlet opening through said first section exteriorly of said container for egress of molten copper; a second section of reducing lining in said container in fluid communication with said first section; a second outlet opening through said second section exteriorly of said container; and mounting means mounting said container for movement to shift materials from said first section to said second section for reducing in said second section.

2. The combination according to claim 1, in combination with a third section of refractory lining in said container spaced axially thereof from said first section; a fourth section of reducing lining in said container spaced axially from said second section; and a partition interposed in the space between said first and second sections and said third and fourth sections.

3. The combination according to claim 1, said first and second sections being in generally side-by-side relation within said container, and said mounting means mounting said container for angular movement to gravitationally shift materials between said sections.

4. The combination according to claim 3, said container being generally cylindrical and said sections being generally arcuate cylindrical segments, said mounting means mounting said generally cylindrical container for axial rotative movement to angularly shift said segments.

5. The combination according to claim 3, in combination with a third section of reducing lining in generally side-by-side relation with and on the opposite side of said first section as said second section, said mounting means mounting said container for selective angular movement to gravitationally shift materials between said first section and a selected one of said second and third sections.

6. The combination according to claim 5, said container being of elongate configuration and said sections being arranged in a row longitudinally of said container; said mounting means mounting said container for tilting about a transverse axis and rotative movement about a longitudinal axis; and barriers in said container intermediate adjacent sections; said barriers having angularly spaced openings gravitationally passing material through respective openings upon predetermined tilting and rotative movement, whereby material may be passed between a selected adjacent pair of said sections while other material is retained in the remaining section.

7. The combination according to claim 2, wherein at least one refractory lining is acid.

References Cited
UNITED STATES PATENTS

| | | | |
|---|---|---|---|
| 1,036,500 | 8/1912 | Lamb | 266—36H |
| 2,229,383 | 1/1941 | Lohse | 266—36H |
| 2,641,461 | 6/1953 | Lewis | 266—43 |
| 3,312,457 | 4/1967 | Schweinsberg et al. | 266—43 |

GERALD A. DOST, Primary Examiner

U.S. Cl. X.R.

266—24, 43